United States Patent [19]

Kasai

[11] Patent Number: 5,788,530

[45] Date of Patent: Aug. 4, 1998

[54] PREVENTING MEANS FOR PREVENTING AN ERRONEOUS LOCKING OF A COVER FOR A CONNECTOR AND ELECTRICAL CONNECTION BOX USING THE SAME

[75] Inventor: Koji Kasai, Yokkaichi, Japan

[73] Assignee: Sumitomo Wiring Systems, Ltd., Japan

[21] Appl. No.: 740,867

[22] Filed: Nov. 4, 1996

[30] Foreign Application Priority Data

Nov. 30, 1995 [JP] Japan .................................. 7-312319

[51] Int. Cl.⁶ ...................................................... H01R 13/62
[52] U.S. Cl. .............................................. 439/372; 439/142
[58] Field of Search ................................... 439/372, 133, 439/135, 157

[56] References Cited

U.S. PATENT DOCUMENTS

| | | | |
|---|---|---|---|
| 3,246,103 | 4/1966 | Bellek . | |
| 5,017,147 | 5/1991 | Sugiyama | 439/372 |
| 5,139,432 | 8/1992 | Sugiyama et al. | 439/372 |
| 5,312,266 | 5/1994 | Daoud | 439/133 |
| 5,464,351 | 11/1995 | Oka | 439/372 |
| 5,598,624 | 2/1997 | Ito et al. | 29/593 |

FOREIGN PATENT DOCUMENTS

| | | |
|---|---|---|
| 77 07 998 | 8/1977 | Germany . |
| 94 10 773.4 | 11/1994 | Germany . |
| WO 91/10271 | 7/1991 | WIPO . |

*Primary Examiner*—Neil Abrams
*Assistant Examiner*—Tho D. Ta
*Attorney, Agent, or Firm*—Anthony J. Casella; Gerald E. Hespos; Ludomir A. Budzyn

[57] ABSTRACT

To provide a construction for preventing an erroneous locking of a double-lock cover for a connector which construction can be securely preventing an erroneous locking and produced at a reduced cost. A double-lock cover 5 is pivotally mounted at one side of a connector receptacle 3A of an electrical connection box in such directions to open and close the receptacle. The double-lock cover 5 is biased by a spring 6 in the direction to open the receptacle 3A while being unused, and is simultaneously locked with a connector 4A fitted into the receptacle 3A and with the receptacle 3A by being pivoted in the direction to close the receptacle 3A against the biasing force of the spring 6 when being used. A stopper plate 8 is detachably mountable between the receptacle 3A and the double-lock cover 5 for preventing the double-lock cover 5 from pivoting in the closing direction. The stopper plate 8 is detached when the double-lock cover 5 is used.

14 Claims, 8 Drawing Sheets

PREVENTING MEANS FOR PREVENTING AN ERRONEOUS LOCKING OF A COVER FOR A CONNECTOR AND ELECTRICAL CONNECTION BOX USING THE SAME

BACKGROUND OF THE INVENTION

1. Field of the Invention

The present invention relates to a preventing means or construction for preventing an erroneous locking of a cover, in particular double-lock cover for a connector. The invention also relates to a connection box, in and particular an electrical connection box using a preventing means to securely prevent an erroneous locking, while enabling manufacture at a reduced cost.

2. Description of the Prior Art

Figure 10:
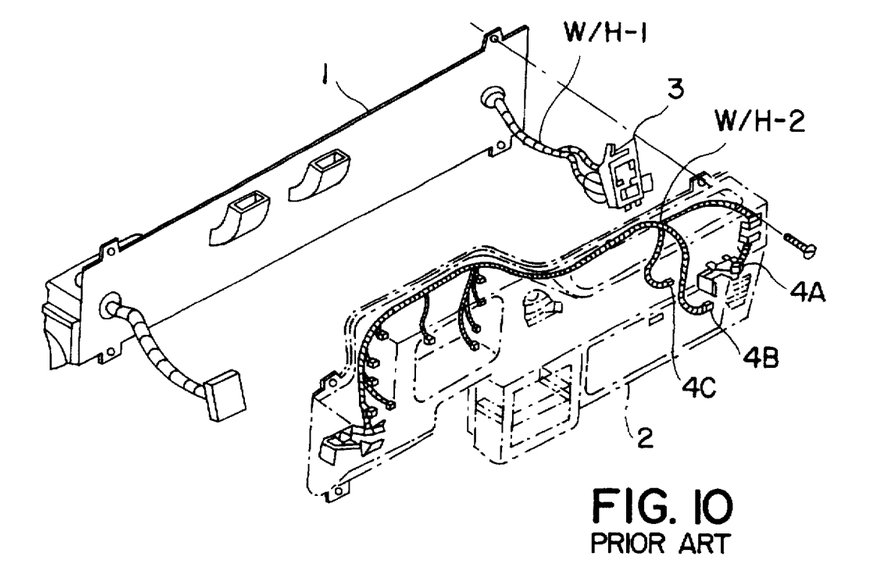
FIG. 10 is a perspective view showing a prior art wiring harness installed in a cowl panel and a prior art wiring harness installed in an instrument panel.

A prior art automotive wiring harness system includes a wiring harness W/H-1 installed in a cowl panel 1 and a wiring harness W/H-2 installed in an instrument panel 2 as shown in FIG. 10. The illustrated parts of the prior art system are connected by a wiring harness manufacturer who indemnifies against unengaged and partly engaged connectors.

Figure 11A:
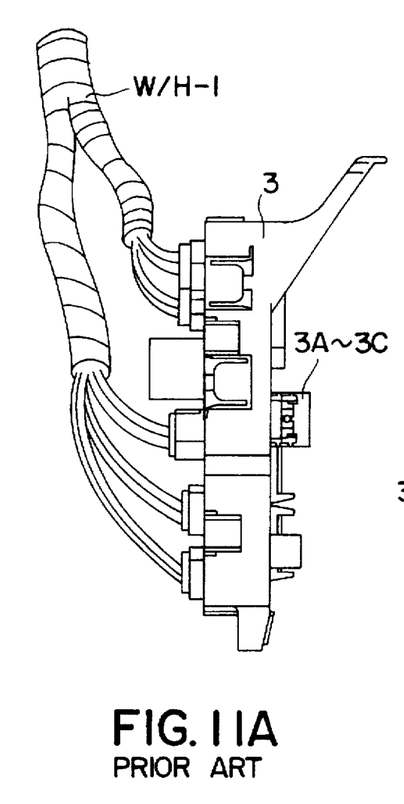
FIGS. 11(A) and 11(B) are side and front views of a prior art electrical connection box.
Figure 11B:
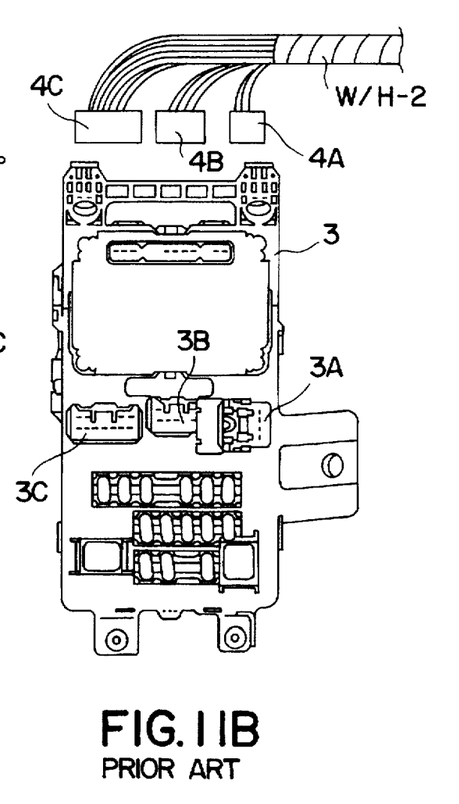

Some assembly lines for the production of automotive vehicles preclude use of the prior art wiring harness in which the wiring harness W/H-1 installed in the cowl panel 1 and the wiring harness W/H-2 installed in the instrument panel 2 are connected at the wiring harness manufacturer. Rather, with reference to FIG. 11, an operation of fitting connectors 4A, 4B, 4C of the prior art wiring harness W/H-2 into connector receptacles 3A, 3B, 3C of an electrical connection box 3 for the wiring harness W/H-1 is performed at the assembly line of a car manufacturer.

In the case that a connector 4A for an air bag system is connected with the wiring harness W/H-2 installed in the instrument panel 2, it is necessary to doubly assure that the connector 4A is neither unengaged nor partly engaged since the connector 4A is an important connector which affects people's life.

Figure 12A:
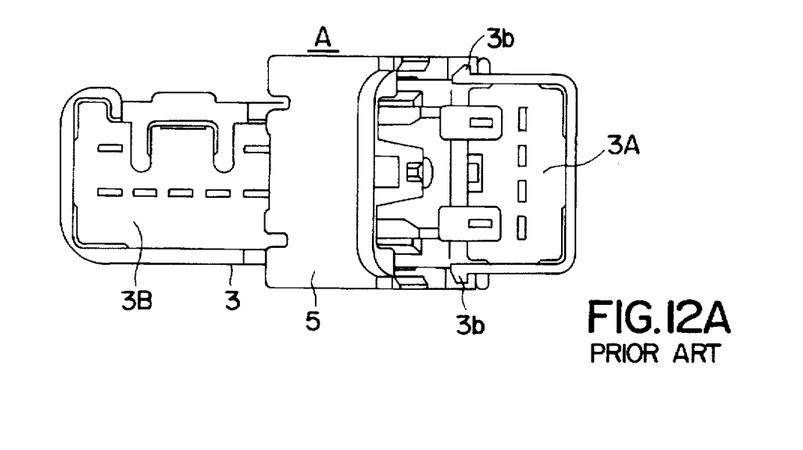
FIGS. 12(A) and 12(B) are a plan view and a side view in section of a prior art erroneous locking preventing construction for a double-lock cover.
Figure 12B:
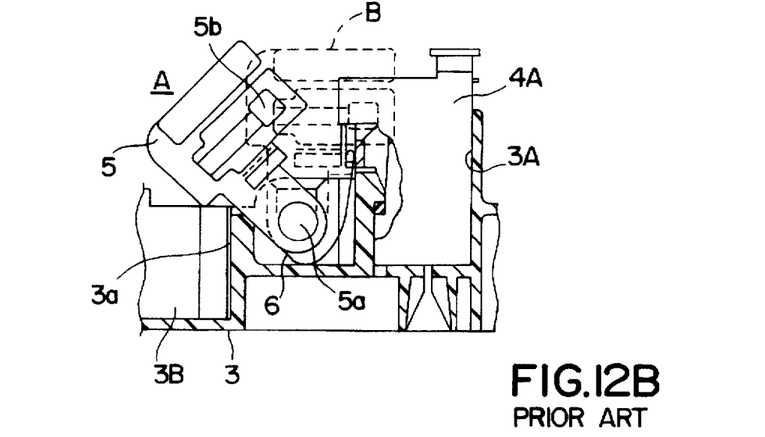

Thus, as shown in FIGS. 12(A) and 12(B), the prior art connector 4A has a double-lock cover 5 which locks after the connector 4A is fitted into the connector receptacle 3A of the electrical connection box 3.

The double-lock cover 5 is pivotally mounted on the electrical connection box 3 in a position at one side of the receptacle 3A by a hinge shaft 5a such that it opens and closes the receptacle 4A. While being not used, the double-lock cover 5 is biased by a leaf spring 6 to open the receptacle 3A, and rests on an upright wall 3a of the adjacent receptacle 3B in its lower position A.

When being used, the double-lock cover 5 is pivoted upwardly against the biasing force of the leaf spring 6 so as to close the receptacle 3A, thereby lockingly engaging the upper part of the connector 4A fitted into the receptacle 3A (see phantom line in FIG. 12(B). At the same time, lock holes 5b of the double-lock cover 5 are engaged with lock claws 3b of the receptacle 3A. As a result, the double-lock cover 5 is locked in its upper or lock position B.

The double-lock cover 5 is constructed such that it cannot be locked in the upper position B by being deterred by the connector 4A unless the connector 4A is fully fitted into the receptacle 3A.

Further, while being unused, the double-lock cover 5 is biased by the leaf spring 6 in the direction of an unlock or open or upper position A to open the receptacle 3A so that the connector 4A is smoothly fittable into the receptacle 3A, and rests on the upright wall 3a of the adjacent receptacle 3B, making it impossible to fit the connector 4B into the receptacle 3B unless the double-lock cover 5 is locked in the upper position B.

The above construction is a countermeasure against an undesirable occurrence where the connector 4A is not fitted or only partly fitted.

Figure 12C:
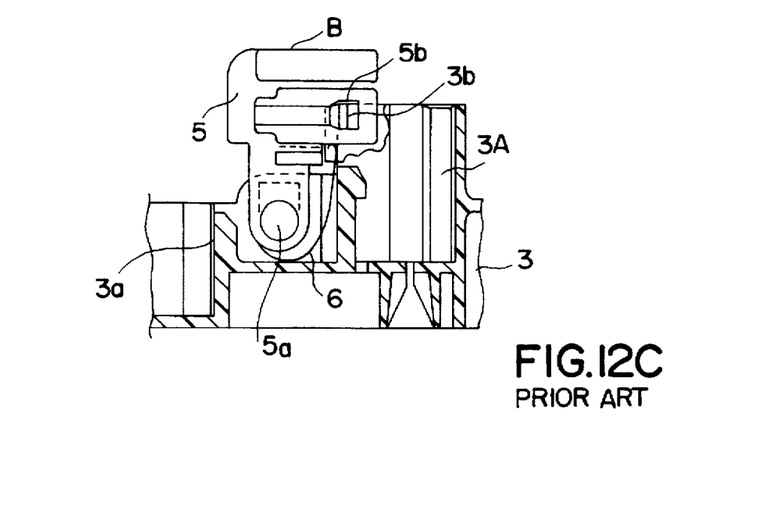
FIG. 12(C) is a side view in section of this construction when the double-lock cover is erroneously locked.

However, during transportation of the wiring harness W/H-1 from the wiring harness manufacturer to the car manufacturer, the double-lock cover 5 may be pivoted to the upper position to close the receptacle 3A upon an impact or the like caused by the contact of, e.g. the wiring harness W/H-1 therewith. In such a case, the locking holes 5b of the double-lock cover 5 may be engaged with locking claws 3b of the receptacle 3A, thereby erroneously locking the double-lock cover 5 in the upper position B without the connector 4A fitted into the receptacle 3A as shown in FIG. 12(C).

In such a case, the car manufacturer has to unlock the double-lock cover 5, which causes problems that the flow of an assembly line production is interrupted, an operator has to change his operation posture, and the unlocking is difficult with gloves on. Thus, there has been a demand for a construction which can prevent an erroneous locking.

The present invention was developed to solve the above problems, and an object thereof is to provide a preventing means and an electrical connection box using the same, which can securely prevent an erroneous locking of a cover for a connector and can be produced at a reduced cost.

SUMMARY OF THE INVENTION

According to the invention there is provided a preventing means or construction for preventing an erroneous locking of a cover, in particular of a double-lock cover for a connector and/or a connection box, in which the cover is pivotally mounted at one side of a receptacle of an electrical connection box for the connector in such directions to substantially open and close the receptacle, comprising: a stopper plate or stopper plate portion or stopper means detachably mountable between a receptacle and a pivotable cover in particular a double-lock cover, for preventing the cover from pivoting in a closing direction, wherein the stopper plate or means is detachable when the cover is to be used or closed.

According to a preferred embodiment of the invention there is provided a construction for preventing an erroneous locking of a double-lock cover for a connector in which the double-lock cover is pivotally mounted at one side of a receptacle of an electrical connection box for the connector in such directions to open and close the receptacle, is biased by a spring in the direction to open the receptacle while being unused, and is simultaneously locked with the connector fitted into the receptacle and with the receptacle by being pivoted in the direction to close the receptacle against the biasing force of the spring when being used, comprising:

a stopper plate or means detachably mountable between the receptacle and the double-lock cover for preventing the double-lock cover from pivoting in the closing direction, wherein the stopper plate or means is detached when the double-lock cover is used.

Accordingly, by mounting the detachable stopper plate between the connector receptacle of the electrical connection boy and the double-lock cover, the pivotal movement of the double-lock cover in the direction to close the receptacle can be prevented while the double-lock cover is unused.

Since the stopper plate or means can be detached when the double-lock cover is used, i.e. immediately before the connector is fitted, the double-lock cover is not erroneously locked during transportation, thereby eliminating the need for an unlocking operation at the car manufacturer.

Further, if the stopper plate or means can be formed into a substantially simple rectangular shape of synthetic resin, it can be cheaply fabricated to the extent that it can be used once and thrown away. The stopper plate or means can be more cheaply fabricated if the synthetic resin material is obtained by recycling mold scraps of other products and defective products.

As is clear from the above description, while the double-lock cover is unused, the above erroneous locking preventing construction prevents the double-lock cover from pivoting in the direction to close the receptacle by the stopper plate or means mounted between the receptacle and the double-lock cover.

Since the stopper plate or means is detached when the double-lock cover is used, the double-lock cover is not erroneously locked during transportation, thereby eliminating the need for an unlocking operation at the car manufacturer. Further, since the stopper plate or means is formed of synthetic resin into a substantially simple configuration, it can be so cheaply fabricated that it is used once and thrown away. The stopper plate or means can be more cheaply fabricated if the synthetic resin is obtained by recycling mold scraps of other products and defective products.

The width of the stopper plate or means is preferably larger than that of the double-lock cover.

Accordingly, the pivotal movement of the double-lock cover in the closing direction can be securely prevented.

Thus, the pivotal movement of the double-lock cover in the closing direction can be securely prevented.

Preferably, a bent portion extendible or arrangeable above the receptacle is formed at an edge, in particular upper edge, of the stopper plate or means.

Accordingly, the stopper plate or means can be easily mounted and detached by pressing and pulling the bent portion. Further, since the bent portion deters the insertion of the connector into the receptacle unless the stopper plate or means is detached, it prevents an operator from forgetting to detach the stopper plate or means.

Thus, the stopper plate or means can be easily mounted and detached by pressing and pulling the bent portion. Further, since the bent portion deters the insertion of the connector into the receptacle unless the stopper plate or means is detached, it prevents an operator from forgetting to detach the stopper plate or means.

The stopper plate or means is preferably formed with a locking portion being engageable with a locking means of the receptacle, comprising in particular a locking recess.

Accordingly, an inadvertent detachment of the stopper plate or means due to an impact or the like can be prevented.

According to a preferred embodiment of the invention, the stopper plate or means is engageable with the cover in a direction of deflection or deformation of the stopper plate or means toward the cover being in an unlock position, in particular such, that the locking portion is engageable or remains engaged with the locking means also when the stopper plate or means is deformed.

Preferably, an open angle position of the double-lock cover may be set such that the double-lock cover stops the deformation of the stopper plate or means in such a direction to open the receptacle, thereby preventing the locking portion from being disengaged from the locking recess.

Accordingly, the disengagement of the locking portion from the locking recess due to the deformation of the stopper plate or means caused by an impact or the like can be prevented.

Notches may be preferably formed adjacent, in particular above the locking portion of the stopper plate or means, in particular so as to weaken the stiffness of the stopper plate or means to make it more or easier deformable.

Accordingly, since the upper portion of the stopper plate or means is more easily deformable upon an impact or the like, the disengagement of the locking portion from the locking recess can be securely prevented.

According to a preferred embodiment, the preventing means further comprises one or more securing portions for securing the preventing means to a connector and/or an electrical connection box, the securing portion comprising in particular a blade member or portion fittable or insertable into or in a recess provided on the connector and/or the electrical connection box.

Preferably, the preventing means further comprises a connector insertion preventing means for preventing an insertion of the connector into the electrical connection box.

According to the invention there is further provided an electrical connection box or connector, comprising: at least one preventing means according to the invention, at least one receptacle for a connector particularly of a wiring harness, and at least one cover, in particular a double-lock cover, for substantially covering the receptacle, the cover being pivotally mounted at one side of the receptacle in such directions to substantially open and close the receptacle, wherein the preventing means is removably arranged between the receptacle and the cover.

According to a preferred embodiment, the cover is lockable with the receptacle via locking means, in particular simultaneously lockable when the connector is fitted into the receptacle.

Preferably, the cover is biased by a spring in the direction of a position to open the receptacle while being unused or before being used.

Further preferably, one single preventing means is used for one or more covers to prevent them from closing before use, wherein preferably one preventing means is provided for each cover.

BRIEF DESCRIPTION OF THE DRAWINGS

These and other objects, features and advantages of the present invention will become more apparent upon a reading of the following detailed description and accompanying drawings in which.

DETAILED DESCRIPTION OF THE PREFERRED EMBODIMENTS

It should be noted that construction and actions that are the same as in the prior art of FIGS. 10 to 12 are not described herein, and comparable elements are merely identified by the same reference numerals.

Figure 4A:
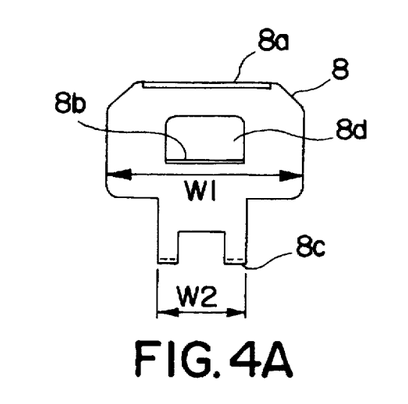
FIGS. 4(A), 4(B) and 4(C) are front, side and plan views of a stopper plate or means according to the first embodiment of the invention.
Figure 4B:
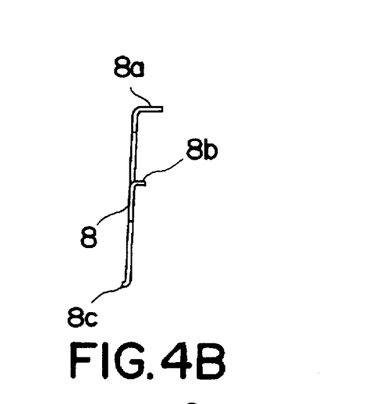
Figure 4C:
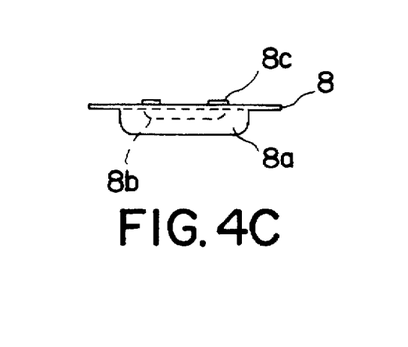

A stopper plate or stopper means 8 having a substantially rectangular shape and made e.g. of synthetic resin is configured as shown in FIGS. 4(A) to 4(C). Specifically, the upper edge of an upper portion of the stopper plate 8 having a width W1 larger than a width W3 of a cover 5, in particular a double-lock cover 5 is bent in one direction to form a bent portion 8a, and an opening 8d is formed substantially in the center of the upper portion. The lower edge of the stopper plate 8 adjacent to the opening 8d is bent by a short length in the one direction to form a locking portion 8b. Further, lower edges 8c of a lower portion having a narrow width W2 are bent by a short length substantially in the other direction.

Figure 1:
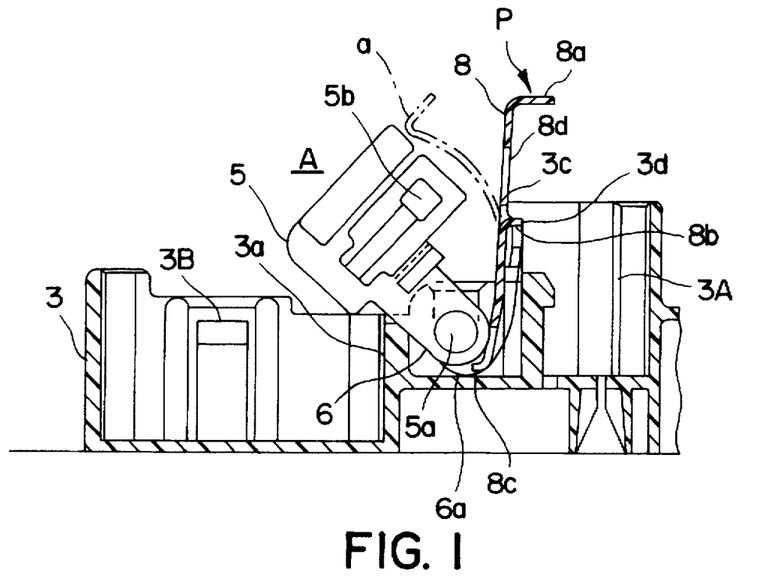
FIG. 1 is a side view in section of an erroneous locking preventing construction or preventing means for a double-lock cover according to a first embodiment of the invention.
Figure 2:
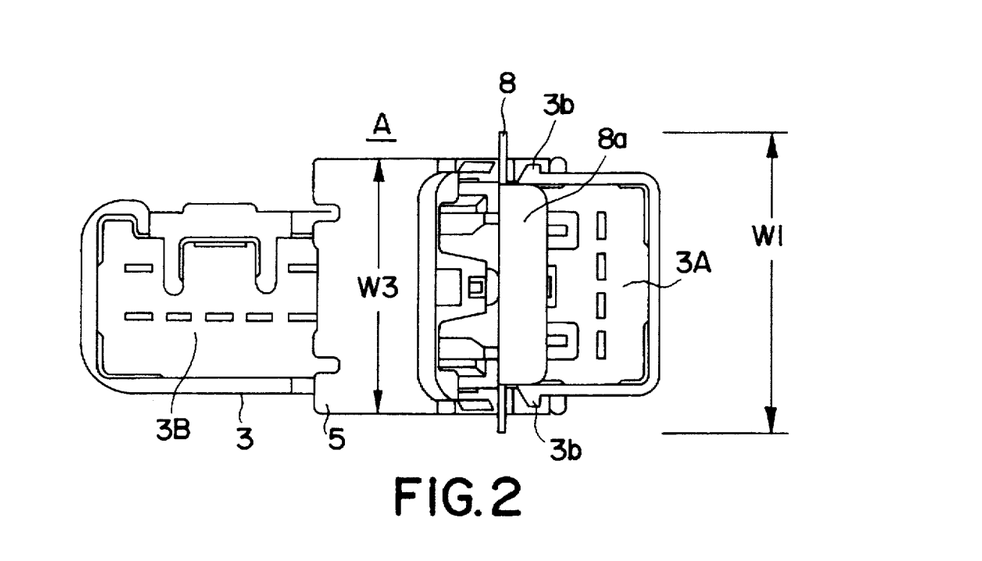
FIG. 2 is a plan view of the construction of FIG. 1.

The stopper plate 8 is, in particular withdrawably, substantially inserted into a clearance between a connector receptacle 3A of an electrical connection box 3 and the double-lock cover 5 by pressing the bent portion 8a down with fingers from an upper side P. The lower edges 8c are slightly slipped underneath a hinge shaft 5a of the double-lock cover 5 while being slid along the upper surface of a curved portion 6a of a leaf spring 6 as shown in FIGS. 1 and 2.

When the stopper plate 8 is substantially fully mounted between the receptacle 3A and the double-lock cover 5, the locking portion 8b thereof engages a locking recess 3d formed on an outer wall 3c of the receptacle 3A (see FIG. 3), thereby particularly fixing or securing the stopper plate 8 on the double-lock cover 5.

At the wiring harness manufacture, before the electrical connection box 3 is transported to a car manufacturer, specifically when the double-lock cover 5 is mounted on the electrical connection box 3, the stopper plate 8 is insertably mounted between the receptacle 3A and the double-lock cover 5 in a lower or unlock or open position A where it is biased by the leaf spring 6 to open the receptacle 3A and rests on an upright wall 3a of an adjacent receptacle 3B, bringing the locking portion 8b into engagement with the locking recess 3d of the receptacle 3A.

Thus, even if there is an impact caused by the contact of the wiring harness W/H–1 with the double-lock cover 5 during transportation (while the double-lock cover 5 is unused), the stopper plate 8 prevents the double-lock cover 5 from pivoting upward to close the receptacle 3A.

Accordingly, the double-lock cover 5 is not erroneously locked in the upper position B, thereby obviating the need for the car manufacturer to unlock the double-lock cover 5.

Figure 3:
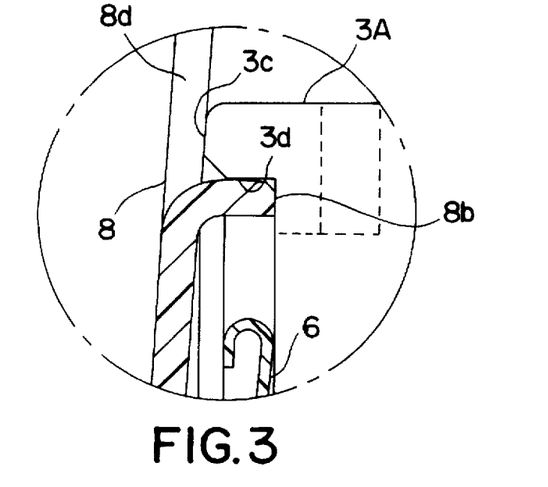
FIG. 3 is an enlarged view of an essential portion of the construction of FIG. 1.

The stopper plate 8 can be detached by pulling the bent portion 8a upwardly by fingers and forcibly disengaging the locking portion 8b from the locking recess 3d when the double-lock cover 5 is used, specifically immediately before the connector 4A is fitted during the assembly line operation at the car manufacturer.

After detachment of the stopper plate 8, the connector 4A can be fitted into the receptacle 3A. When being pivoted upward to close the receptacle 3A against the biasing force of the leaf spring 6, the double-lock cover 5 can be locked with the upper portion of the connector 4A fitted into the receptacle 3A and, simultaneously, the locking holes 5b of the double-lock cover 5 engage the locking claws 3b of the receptacle 3A, with the result that the double-lock cover 5 is locked with the receptacle 3A.

Since the stopper plate 8 can be formed into a simple substantially rectangular shape of synthetic resin as shown in FIGS. 4(A) to 4(C), it can be so cheaply fabricated that it is used only once and thrown away.

If the synthetic resin is obtained by recycling mold scraps of other products and defective products, the stopper plate 8 can be even more cheaply fabricated.

Since the width W1 of the stopper plate 8 is larger than the width W3 of the double-lock cover 5 (W1>W3) in the foregoing embodiment as shown in FIG. 2, even if the cover 5 is shifted along the widthwise direction of the stopper plate 8, the stopper plate 8 can securely prevent the cover 5 from pivoting upward to open the receptacle 3A because its longer width W1.

Further, the bent portion 8a formed at the upper edge of the stopper plate 8 facilitates the mounting (insertion) and detachment of the stopper plate 8 and prevents an operator from forgetting to detach the stopper plate 8 since it, otherwise, hinders the insertion of the connector 4A into the receptacle 3A.

Furthermore, the engagement of the locking portion 8b of the stopper plate 8 with the locking recess 3d of the receptacle 3A prevents the stopper plate 8 from inadvertently being detached upon an impact or the like.

The height of the upright wall 3a of the electrical connection box 3 may be adjusted to set the open position of the double-lock cover 5 (lower or unlock position A) in such an angle position where the deformation of the stopper plate 8 in such a direction to open the receptacle 3A is stopped by the double-lock cover 5 (see phantom line a in FIG. 1) and the locking portion 8b is not disengaged from the locking recess 3d. This adjustment prevents the locking portion 8b from being disengaged from the locking recess 3d upon the deformation of the stopper plate 8 caused by an impact or the like.

Figure 4D:
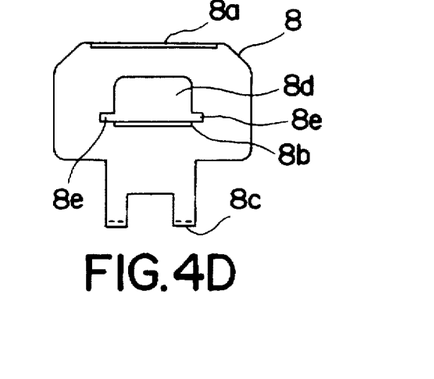
FIG. 4(D) is a front view of one modification of the stopper plate according to a second embodiment of the invention.

Further, if notches 8e are formed at the opposite sides of the opening 8d as shown in FIG. 4(D), the portion of the stopper plate 8 above the notches 8e is easily deformable upon an impact or the like. Accordingly, the disengagement of the locking portion 8b from the locking recess 3d can be securely prevented.

Figure 7A:
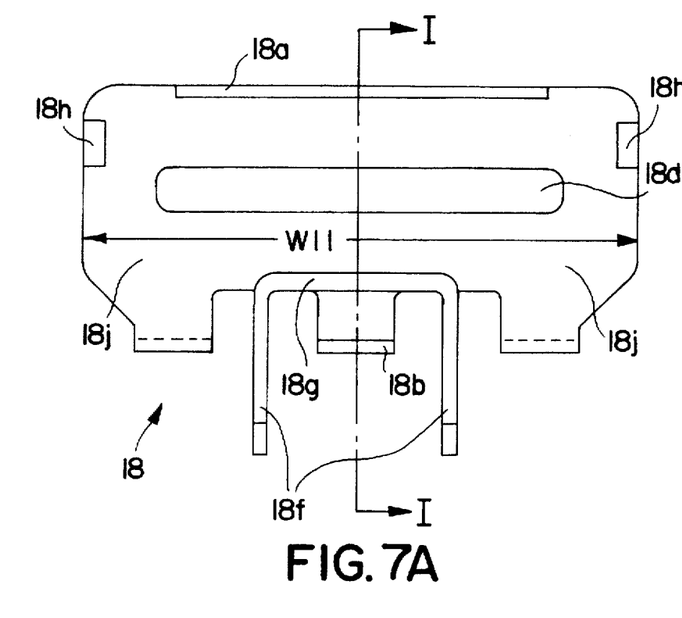
FIG. 7(A) is a front view of a stopper plate according to the third embodiment of the invention, FIG. 7(B) a sectional view along line I—I of FIG. 7(A)
Figure 7B:
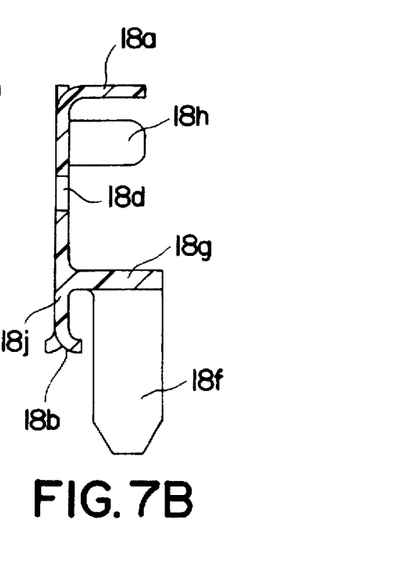
Figure 7C:
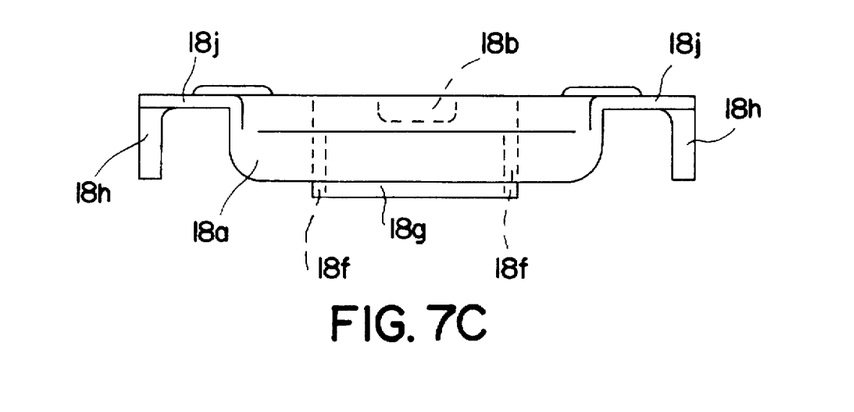
FIG. 7(C) is a plan view of the stopper plate of FIG. 7(A).

A stopper plate or stopper means 18 having a substantially rectangular shape and made e.g. of synthetic resin is configured as shown in FIGS. 7(A) to 7(C). Specifically, the upper edge of an upper portion of the stopper plate 18 having a width W11 larger than a width W3 of a double-lock cover 5 is bent in one direction to form a bent portion 18a, and an opening 18d is formed substantially in the center of the upper portion. The lower edge of the stopper plate 8 spaced towards the bottom from the opening 8d is bent by a short length in the one direction to form a locking portion 18b.

Figure 8A:
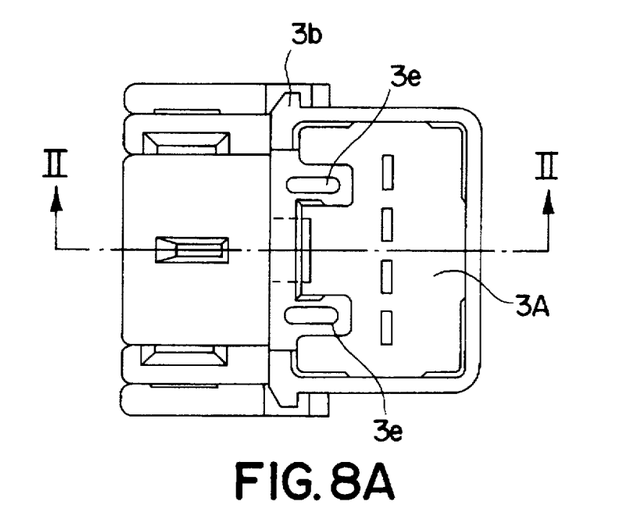
FIG. 8(A) is a plan view of an electrical connection box or connector receptacle according to the third embodiment of the invention.
Figure 8B:
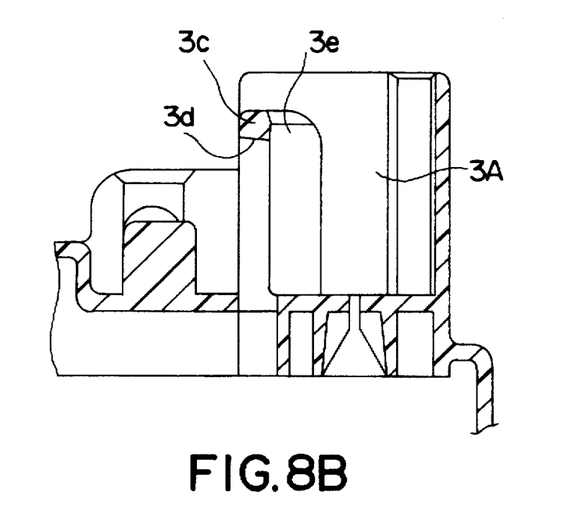
FIG. 8(B) is a sectional view along line II—II of FIG. 8(A).

The stopper plate 18 is, in particular withdrawably, substantially arranged between a connector receptacle 3A of an electrical connection box 3 and the double-lock cover 5 by pressing the bent portion 8a down with fingers from an upper side P. Thereby blade members 18f projecting to the one side from a lower portion of the stopper plate 18 are inserted or fitted into holding recesses or holes 3e provided on or at the connector receptacle 3A, preferably in a border region thereof and laterally extending into the connector receptacle 3A.

When the stopper plate 18 is substantially fully arranged or mounted between the receptacle 3A and the double-lock cover 5, i.e. the blade members 18f are substantially fitted into the holding recesses 3e of the receptacle 3A, the locking portion 18b thereof engages a locking recess 3d formed on an outer wall 3c of the receptacle 3A (see FIG. 6 and FIG. 9), thereby particularly fixing or securing the stopper plate 8 on the double-lock cover 5.

Figure 6:
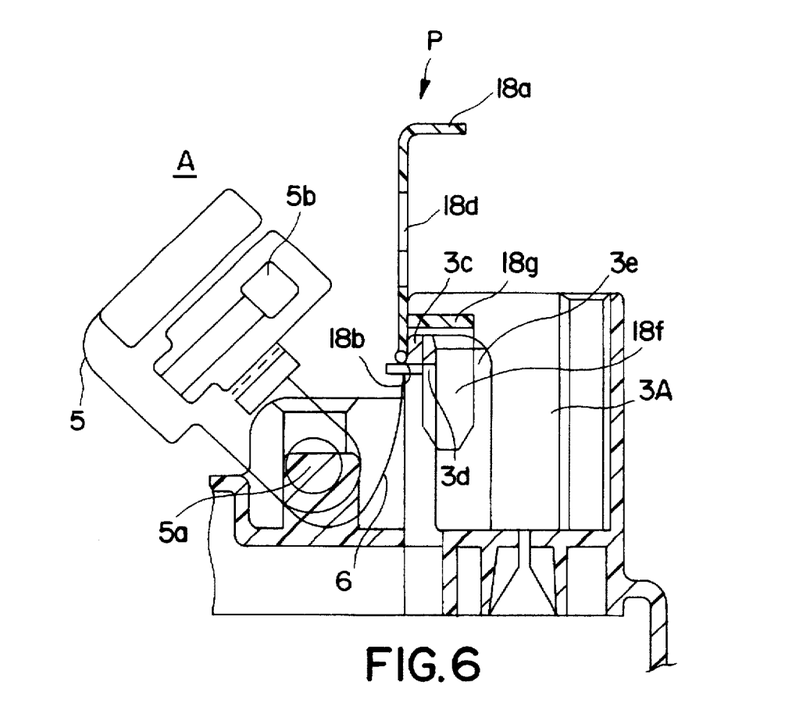
FIG. 6 is a side view in section of the construction of FIG. 5.

At the wiring harness place of manufacture, before the electrical connection box 3 is transported to a car manufacturer, specifically when the double-lock cover 5 is mounted on the electrical connection box 3, the stopper plate 18 is insertably mounted or arranged by inserting the blade member 18f in the holding recess 3e on the connector receptacle 3A, thereby arranging an intermediate portion 18j of the stopper plate 18 between the receptacle 3A and the double-lock cover 5 in a lower or unlock or open position A, where it is biased by the leaf spring 6 to open the receptacle 3A and rests on an upright wall 3a of an adjacent receptacle 3B, bringing the locking portion 18b into engagement with the locking recess 3d of the receptacle 3A.

Thus, even if there is an impact caused by the contact of the wiring harness W/H–1 with the double-lock cover 5 during transportation (while the double-lock cover 5 is unused), the stopper plate 18 prevents the double-lock cover 5 from pivoting upwardly to close the receptacle 3A, in particular by means of the intermediate portion 18j coming into contact with a front portion of the double-lock cover 5 as e.g. in proximity of the lock holes 5b. Accordingly, the double-lock cover 5 is not erroneously locked in the upper position B, thereby obviating the need for the car manufacturer to unlock the double-lock cover 5.

Figure 9:
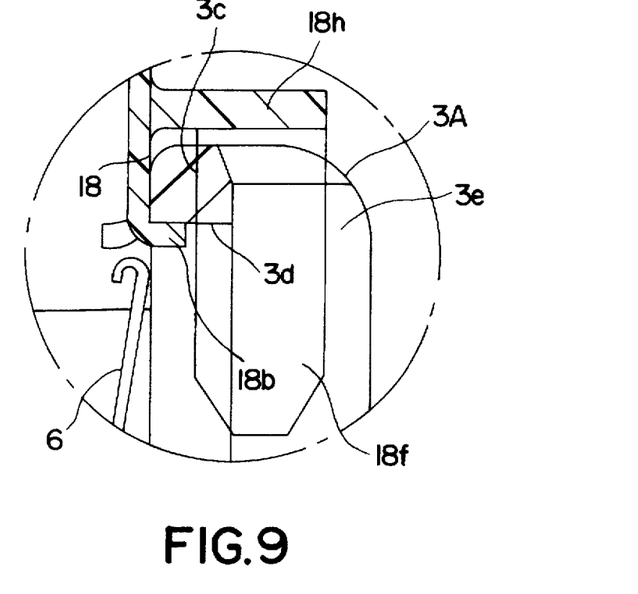
FIG. 9 is an enlarged view of an essential portion of the construction of FIG. 6.

The stopper plate 18 can be detached by pulling the bent portion 18a upward by fingers and forcibly disengaging the locking portion 18b from the locking recess 3d when the double-lock cover 5 is used, specifically immediately before the connector 4A is fitted during the assembly line operation at the car manufacturer.

After detachment of the stopper plate 18, the connector 4A can be fitted into the receptacle 3A. When being pivoted upward to close the receptacle 3A against the biasing force of the leaf spring 6, the double-lock cover 5 can be locked with the upper portion of the connector 4A fitted into the receptacle 3A and, simultaneously, the locking holes 5b of the double-lock cover 5 engage the locking claws 3b of the receptacle 3A, with the result that the double-lock cover 5 is locked with the receptacle 3A.

Since the stopper plate 18 can be formed into a simple substantially rectangular shape of e.g. synthetic resin or by injection molding, as shown in FIGS. 7(A) to 7(C), it can be so cheaply fabricated that it is used only once and thrown away.

If the synthetic resin is obtained by recycling mold scraps of other products and defective products, the stopper plate 18 can be even more cheaply fabricated.

Figure 5:
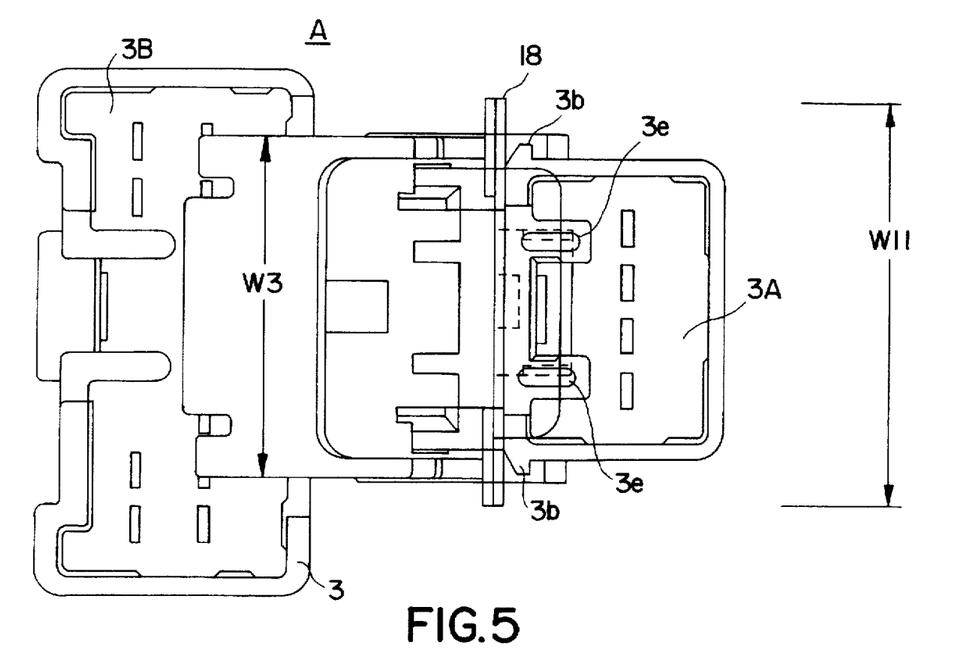
FIG. 5 a plan view of the construction of an erroneous locking preventing construction or preventing means for a double-lock cover according to a third embodiment of the invention.

Since the width W11 of the stopper plate 18 is larger than the width W3 of the double-lock cover 5 (W11>W3) in the foregoing embodiment as shown in FIG. 5, even if the cover 5 is shifted along the widthwise direction of the stopper plate 18, the stopper plate 18 can securely prevent the cover 5 from pivoting upward to open the receptacle 3A because its longer width W11.

Further, the bent portion 18a formed at the upper edge of the stopper plate 18 facilitates the mounting (insertion) and detachment of the stopper plate 18 and prevents an operator from forgetting to detach the stopper plate 18 since it, otherwise, hinders the insertion of the connector 4A into the receptacle 3A.

Furthermore, the engagement of the locking portion 18b of the stopper plate 18 with the locking recess 3d of the receptacle 3A prevents the stopper plate 18 from inadvertently being detached upon an impact or the like.

The height of the upright wall 3a of the electrical connection box 3 may be adjusted to set the open position of the double-lock cover 5 (lower or unlock position A) in such an angle position where the deformation of the stopper plate 18 in such a direction to open the receptacle 3A is stopped by the double-lock cover 5 and the locking portion 18b is not disengaged from the locking recess 3d. This adjustment prevents the locking portion 18b from being disengaged from the locking recess 3d upon the deformation of the stopper plate 18 caused by an impact or the like. The stopper plate 18 is secured or mounted to the connector receptacle 3A by means of the blade member 18f. However the stopper plate 18 may be secured to the connector receptacle 3A by means of a holding means having a shape different from the blade member 18f and allowing an easy mounting as e.g. by insertion, clipping or clamping, press fitting or the like.

The preventing means or the stopper plate 18 may be provided with one or more manipulation portions 18h (two in the embodiment depicted in FIG. 7(A) to (C)) being provided at an angle different from 0° or 180°, preferably substantially normal to the planar surface substantially containing the stopper plate 18 for permitting an easier handling of the stopper plate 18 e.g. for allowing a better grip with a hand.

Preferably the preventing means or the stopper plate 18 is provided with a bridging portion 18g particularly being formed by a projection substantially projecting into the one direction (the same direction as the locking portion 18b) i.e. toward the connector receptacle 3A, when the stopper plate 18 is arranged by means of the blade portions 18e on or at the connector receptacle 3A (mounted state). Preferably the bridging portion 18g projects inside the receptacle 3A in the mounted state of the stopper plate 18 thereby preventing the insertion of a connector 4A into the connector receptacle 3A. Thus an insertion of the connector 4A into the receptacle 3A is prohibited by the bridging member 18g, if the stopper plate 18 is not removed.

LIST OF REFERENCE NUMERALS

3 . . . Electrical Connection Box
3A . . . Receptacle
3d . . . Locking Recess
3e . . . Holding Recess
4A . . . Connector
5 . . . Double-Lock Cover
6 . . . Leaf Spring 8, 18 ... Stopper Plate or Stopper Means
8a, 18a ... Bent Portion
8b, 18b ... Locking Portion
8c ... Lower Edge
8d, 18d ... Opening
8e ... Notch
18f ... Blade Members
18g ... Bridging Portion
18h ... Manipulation Portion

What is claimed is:

1. A locking preventer for an electrical connection box (3), said electrical connection box being formed with plurality of side walls defining a receptacle (3A) for receiving a connector (4A), at least one recess (3d; 3e) being formed in one said side wall, a cover (5) pivotally mounted to said electrical connection box (3) at a hinge parallel to said side wall of said receptacle (3A), said side wall of said receptacle (3A) having said recess (3d; 3e) for pivoting movement between a first position where the receptacle (3A) is substantially open for receiving the connector (4A) and a second position where said cover (5) lockingly covers at least a portion of said connector (4A) in said receptacle (3A), said locking preventer comprising:

a stopper (8; 18) having a deflectable plate portion slidably disposed between the receptacle (3A) and the pivotable cover (5), a locking portion (8b; 18b) projecting from said plate portion and being releasably locked with said recess (3d; 3e), said plate portion of said stopper (8; 18) being dimensioned and configured for preventing the cover (5) from pivoting completely into said second position where said cover (5) lockingly covers at least a portion of said receptacle (3A), the stopper (8; 18) being detachable in response to sufficient deflection of said deflectable plate portion for releasing said locking portion (8b; 18b) from said recess (3d; 3e), thereby enabling selective pivoting movement of the cover (5) completely to said second position where said cover (5) lockingly covers at least a portion of said receptacle (3A).

2. A locking preventer according to claim 1, wherein the cover defines a width (W3), the stopper (8; 18) having a width (W1) that is larger than the width (W3) of the cover (5).

3. A locking preventer according to claim 1, further comprising at least one securing portion (18f) for securing the locking preventer to at least one of the connector (4A) and the electrical connection box (3), the securing portion (18f) comprising a blade member (18f) fittable in a recess (3e) provided on one of the connector (4A) and the electrical connection box (3).

4. A locking preventer according to claim 1, further comprising a connector insertion preventing means (18h) for preventing an insertion of the connector (4A) into the electrical connection box (3).

5. A locking preventer according to claim 1, wherein said locking preventer is unitarily formed from a resin material.

6. A locking preventer according to claim 1, wherein said plate portion is dimensioned for slidable engagement between said hinge and said side walls defining said receptacle (3A).

7. A locking preventer according to claim 1, wherein the stopper (8; 18) has a bent portion (8a; 18a) formed at an edge of the deflectable plate portion of the stopper (8; 18) said bent portion (8a; 18a) being dimensioned and disposed to block insertion of the connector (4A) into the receptacle (3A) when the stopper (8; 18) is mounted between the receptacle (3A) and the cover (5).

8. A locking preventer according to claim 1, wherein the deflectable plate portion of the stopper (8; 18) is resiliently deflectable into engagement with the cover (5) when the cover (5) is in said first position, the locking portion (8b; 18b) of the stopper (8, 18) being dimensioned to—remain engaged in the locking recess (3d) when the stopper (8; 18) is resiliently deflected into engagement with the cover (5).

9. A locking preventer according to claim 8, wherein notches (8e; 18e) are formed adjacent the locking portion (8b; 18b) of the stopper (8; 18) to weaken the stiffness of the stopper (8; 18) and to make the stopper (8; 18) more easily deformable.

10. A locking preventer according to claim 7, wherein the bent portion (8a; 18a) and the locking portion (8b; 18b) extend substantially parallel to one another and substantially orthogonal to said plate portion.

11. A locking preventer according to claim 10, wherein said plate portion is elongate and includes first and second opposed ends, said bent portion (8a) defining a first bent portion and being disposed at said first end, a second bent portion (8c) being disposed at the second end and being bent in a direction opposite said first bent portion, said second bent portion being dimensioned for engaging the pivotal mounting of said cover (5) to said electrical connection box (3).

12. A connection box (3), comprising:

a plurality of side walls defining at least one receptacle (3A) for receiving a connector (4B) of a wiring harness (W/H-1; W/H-2), one said side wall having a locking recess (3d; 3e), at least one cover (5) pivotally mounted externally of the receptacle (3A) for movement between a first position where said receptacle (3A) is substantially open and a second position where said cover (5) lockingly covers the receptacle (3A), and a preventing means (8; 18) removably arranged between the side walls defining the receptacle (3A) and the cover (5), the preventing means (8; 18) comprising a resiliently deflectable plate portion, a locking portion (8b; 18b) extending from said resiliently deflectable plate portion and being locked in said locking recess (3d) of said side wall defining said receptacle (3A) for preventing the cover (5) from moving completely to said second position for lockingly closing the receptacle (3A), said locking portion (8b; 18b) being releasable from said locking recess (3d) in response to deflection of said deflectable plate portion of said preventing means (8; 18) so that the preventing means is detached from the connection box (3) for permitting the cover to move completely to said second position.

13. A connector box according to claim 12, further comprising a spring (6) for urging the cover in the open direction, said preventing means being disposed between a portion of said spring (6) and said cover (5).

14. A connection box according to claim 12, wherein the preventing means (8; 18) is unitarily formed from a resin material.

* * * * *